United States Patent Office 3,577,414
Patented May 4, 1971

---

3,577,414
BERYLLIUM HYDRIDE TERTIARY AMINE COMPLEXES
Lawrence H. Shepherd, Jr., Baton Rouge, La., assignor to Ethyl Corporation, New York, N.Y.
No Drawing. Continuation-in-part of application Ser. No. 645,560, June 5, 1967. This application Mar. 27, 1968, Ser. No. 716,669
Int. Cl. C07d 87/26, 27/04
U.S. Cl. 260—247                                6 Claims

ABSTRACT OF THE DISCLOSURE

Complexes of beryllium hydride with tertiary amines, containing one molecule of beryllium hydride for each tertiary amino nitrogen atom in the amine, are prepared by reaction of beryllium hydride with an excess of a tertiary amine in a ball or rod mill at ambient temperature and pressure.

---

This application is a continuation-in-part of my prior copending application Ser. No. 645,560, filed June 5, 1967, now abandoned.

This invention relates to and has as its principal object the provision of a novel method for the preparation of amine complexes of beryllium hydride. These amine compositions are molecular complexes of beryllium hydride with tertiary amines wherein the molar ratio of beryllium hydride to amine is 1:1 for monoamines and $n$:1 for polyamines containing $n$ tertiary amino nitrogen atoms, and wherein the amine components include trimethylamine, dimethylethylamine, methyldiethylamine, triethylamine, amines of the formula $$Me_2NR$$

wherein Me represents the methyl radical and R is a straight-chain alkyl radical containing from three to about twelve carbon atoms, N,N-dimethylbenzyl amine, N,N-dimethylcyclohexyl amine, N-methyl pyrrolidine, N-ethyl pyrrolidine, N-methyl piperidine, N-methyl morpholine, tetramethylethylene diamine, triethylene diamine and tripropylene diamine.

A number of distinct and independent processes have been discovered for the preparation of these compounds. One such process comprises reacting beryllium hydride with an excess of the corresponding amine at ambient temperature and pressure in a ball or rod mill and under an atmosphere inert with respect to both reactants and products to produce a reaction product containing the desired molecular complex and excess amine, and separating the molecular complex from the reaction mixture. This process constitutes an embodiment of the present invention. It is well adapted to the preparation of amine derivatives which are weak Lewis bases or which contain highly branched chains or other groups causing steric hindrance and which thus lead to products of reduced thermal stability.

Other embodiments will appear hereinafter.

The process of the present invention exhibits a number of significant advantages over previously published methods for the preparation of beryllium hydride. Thus the amine complexes of this invention represent the only known soluble form of beryllium hydride which can be readily dissociated to yield the free hydride. The present processes can therefore be used to prepare pure beryllium hydride from the impure products of previously published methods of separation or from reject material. This can be accomplished by converting the impure beryllium hydride to an amine complex using the process of this invention, purifying the complex by crystallization, sublimation, or other suitable method, and dissociating the complex thermally to beryllium hydride.

The invention will be more fully understood by reference to the following illustrative examples in which, unless otherwise specified, all parts and percentages are by weight.

EXAMPLE 1

Beryllium hydride triethylamine

The reactor was a 1-liter ball mill one-third full of half-inch balls.

To the reactor were added (1) 217 parts (a 200 percent excess) of triethylamine and (2) 7.7 parts of beryllium hydride (95 percent pure). The reactor was set in rotation and the milling continued for five days at room temperature. The contents of the reactor were then heated to 45° C. and filtered. The filtrate, upon refrigeration, deposited 10 parts of solid identified by chemical analysis as beryllium hydride trietheylamine.

When the process of Example 1 is repeated using N-methyl pyrrolidene instead of triethylamine, similar results are obtained.

EXAMPLE 2

Beryllium hydride N-methyl morpholine

Using the method of Example 1, 20 parts of beryllium hydride and 68 parts of N-methyl morpholine were milled together at room temperature for two days. The product was dissolved in benzene and the mixture was filtered. The benzene and excess N-methyl morpholine were removed under vacuum and 12.24 parts of product were isolated and analyzed.

|  | Analysis | |
|---|---|---|
|  | Found | Theory for beryllium hydride N-methyl morpholine |
| Millimoles H⁻ per gram | 17.31 | 17.85 |
| Millimoles Be Per gram | 10.05 | 8.93 |
| Millimoles amine per gram | 8.87 | 8.93 |

The stoichiometry of the reaction of this invention is not critical. The relative proportions of the reactants can vary from a 100 percent or greater excess of the beryllium hydride to a 100 percent or greater excess of the amine. But a considerable excess, say from 10 up to about 50 percent of the amine is preferred, both because it is the cheaper of the reactants and because the excess amine can serve as reaction solvent. Furthermore, the order of addition of the reactants is unimportant; either reactant can be added to the other with satisfactory results. The reaction temperature can vary from 0° C. or below to the boiling point of the amine under the pressure employed, always provided that the temperature does not exceed about 200° C., the decomposition temperature of beryllium hydride. Provided the ball mill is constructed to hold pressure like an autoclave, the reaction pressure can range from one-tenth atmosphere or less to 100 atmospheres or more but, for ease in operation, atmospheric pressure is preferred.

For the above procedure, the reaction time is simply that required to carry the reaction to a satisfactory degree of completion. This period can range from an hour or less to ten days or more depending upon the particular reaction conditions employed.

A considerable variety of amine reactants can be employed in the ball mill process. These include, in addition to those mentioned above:

N,N-dimethylethyl amine;
N-methyldiethyl amine;
N,N-dimethylisobutyl amine;
N,N-dimethyl-n-hexyl amine;
N,N-dimethyl-n-decyl amine;

N,N-dimethylcyclohexyl amine;
N,N-dimethyl-4-ethylcyclohexyl amine;
N,N-dimethyl-3,5-dimethylcyclohexyl amine;
N,N-dimethyl-3,5-diethylcyclohexyl amine;
N,N-dimethyl-4-ethylbenzyl amine;
N,N-dimethyl-3-isobutylbenzyl amine;
N,N-dimethyl-4-tert-butylbenzyl amine;
N,N-dimethyl-3-n-octylbenzyl amine;
N,N-dimethyl-2-n-decylbenzyl amine;
N,N-dimethyl-4-n-dodecylbenzyl amine;
N,N,N',N'-tetramethyl propylene diamine;
N,N,N',N'-tetramethyl butylene diamine,
triethylene diamine, and
tripropylene diamine As indicated above, the reaction of this invention is carried out under an atmosphere inert with respect to both reactants and products. Dry nitrogen is such an atmosphere, as are also dry helium, neon, argon, krypton, xenon and those saturated aliphatic hydrocarbons which are gaseous under the reaction.

The compounds produced by the process of this invention are useful in the metal plating of substrates, in the preparation of pure metallic beryllium and as reducing agents for such organic compounds as acids, esters, nitriles, ketones, aldehydes and olefins. By pyrolysis under controlled conditions, they yield beryllium hydride which is useful as a source of storable hydrogen, as a medium for the metal plating of substrates, as a source (by thermal decomposition) of pure metallic beryllium and as a component of jet and rocket fuels.

I claim:
1. Process for the preparation of a molecular complex of beryllium hydride with a tertiary organic amine, wherein the molar ratio of beryllium hydride to amine is $n:1$ and $n$ is the number of tertiary amino nitrogen atoms contained in the amine, and wherein the amine is selected from the group consisting of trimethylamine, dimethylethylamine, methyldiethylamine, triethylamine, amines of the formula

$$Me_2NR$$

wherein Me represents a methyl radical and R is a straight-chain alkyl radical containing from three to about twelve carbon atoms, N,N-dimethylbenzyl amine, N,N-dimethylcyclohexyl amine, N-methyl pyrrolidine, N-ethyl pyrrolidine, N-methyl piperidine, N-methyl morpholine, tetramethylethylene diamine, triethylene diamine and tripropylene diamine, which process comprises reacting beryllium hydride with an excess of the corresponding amine at ambient temperature and pressure in a ball or rod mill and under an atmosphere inert with respect to both reactants and products, to produce a reaction product containing said molecular complex and excess amine, and separating said molecular complex from said reaction product.

2. The process of claim 1 wherein said amine is triethylamine.

3. The process of claim 1 wherein said amine is selected from the group consisting of amines of the formula $$Me_2NR$$

wherein Me represents a methyl radical and R is a straight-chain alkyl radical containing from three to about twelve carbon atoms.

4. The process of claim 1 wherein said amine is N,N-dimethylbenzyl amine.

5. The process of claim 1 wherein said amine is N-methyl pyrrolidine.

6. The process of claim 1 wherein said amine is N-methyl morpholine.

References Cited

Coates et al.: J. Chem. Soc. (London), 1954, pp. 2526–2529.

ALEX MAZEL, Primary Examiner

B. I. DENTZ, Assistant Examiner

U.S. Cl. X.R.

23—304; 149—109; 260—293, 326.8, 563, 570.9, 583